(12) United States Patent
Lin

(10) Patent No.: US 7,426,739 B2
(45) Date of Patent: Sep. 16, 2008

(54) OPTICAL DISC DRIVE

(75) Inventor: Jui-Chiang Lin, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 351 days.

(21) Appl. No.: 11/163,282

(22) Filed: Oct. 13, 2005

(65) Prior Publication Data

US 2006/0085803 A1    Apr. 20, 2006

(30) Foreign Application Priority Data

Oct. 18, 2004    (TW) .............................. 93131527 A

(51) Int. Cl.
*G11B 33/02*    (2006.01)
(52) U.S. Cl. .................................................. 720/609
(58) Field of Classification Search ................. 720/609; 360/92; 369/30.48, 30.84, 178.01
See application file for complete search history.

(56) References Cited

U.S. PATENT DOCUMENTS

| | | | | |
|---|---|---|---|---|
| 5,021,902 A | * | 6/1991 | Ishikawa et al. | 360/92 |
| 5,537,268 A | * | 7/1996 | Felde et al. | 360/92 |
| 6,014,353 A | * | 1/2000 | Kong et al. | 369/30.84 |
| 6,366,550 B1 | * | 4/2002 | Shiba | 369/178.01 |
| 6,643,226 B1 | * | 11/2003 | Thayer et al. | 369/30.48 |
| 2002/0122271 A1 | * | 9/2002 | Coffin et al. | 360/92 |
| 2006/0023346 A1 | * | 2/2006 | Jansen et al. | 360/92 |

FOREIGN PATENT DOCUMENTS

| | | | | |
|---|---|---|---|---|
| JP | | 01184657 A | * | 7/1989 |
| JP | | 11273200 A | * | 10/1999 |

* cited by examiner

*Primary Examiner*—Tianjie Chen
(74) *Attorney, Agent, or Firm*—Jianq Chyun IP Office

(57) ABSTRACT

An optical disc drive including a housing, a disc exchanger, a data processing module, an optical disc cassette, a cassette ejector and at least an elastic element is provided. The disc exchanger is disposed inside the housing to operate within an operating range. The data processing module is disposed within the operating range inside the housing. The optical disc cassette is suitable for being set up within the operating range and has at least one hollow. The cassette ejector is disposed on the housing. The elastic element is disposed inside the housing. When the optical disc cassette is stationed inside the housing, a distance is kept between the elastic element and the hollow. The elastic element is disposed on an ejection path of the hollow. The elastic element is suitable for lodging inside the hollow of the optical disc cassette when the optical disc cassette is ejected from the housing.

5 Claims, 8 Drawing Sheets

OPTICAL DISC DRIVE

CROSS-REFERENCE TO RELATED APPLICATION

This application claims the priority benefit of Taiwan application serial no. 93131527, filed on Oct. 18, 2004. All disclosure of the Taiwan application is incorporated herein by reference.

BACKGROUND OF THE INVENTION

1. Field of the Invention

The present invention relates to an electronic device. More particularly, the present invention relates to an optical disc drive.

2. Description of the Related Art

Because of the many advantages of optical storage discs including a large data storage capacity, long service life and low production cost, they are gradually replacing the conventional magnetic storage medium to become one of the indispensable optical storage media. Since a conventional optical disc drive can store at most one optical disc at a time, a user requiring reading the data in another disc needs to change disc manually. Due to our desire for accessing a number of discs rapidly without manual intervention, optical disc drives capable of holding a number of optical discs at a time have been developed. Thus, users can read from specified optical discs whenever they want without the need to stop and spend time changing the disc manually.

FIG. 1 is a schematic cross-sectional view of a conventional optical disc drive. As shown in FIG. 1, the optical disc drive 100 has a housing 110 and an optical disc cassette 140 for holding a plurality of optical discs. To use the optical disc drive 100, a number of optical discs (not shown) are placed inside the optical disc cassette 140 and then the entire optical disc cassette 140 is pushed inside the housing 110. When the user wish to change optical discs, the optical disc cassette is ejected from the housing 110 by means of the force provided by a spring 150. In general, to ensure a smooth ejection of the optical disc cassette 140, a spring 150 capable of producing a large bounce-back force is used. However, the large bounce-back force often leads to the optical disc cassette 140 jumping out from the optical disc drive 100. This type of ejection mechanism not only can ruin the optical discs placed inside the optical disc cassette 140 easily, but can also damage the optical disc cassette 140.

SUMMARY OF THE INVENTION

Accordingly, at least one objective of the present invention is to provide an optical disc drive capable of preventing an optical disc cassette from jumping out of the optical disc drive.

To achieve these and other advantages and in accordance with the purpose of the invention, as embodied and broadly described herein, the invention provides an optical disc drive. The optical disc drive mainly comprises a first housing, a disc exchanger, a data processing module, an optical disc cassette, a cassette ejector and at least an elastic element. The disc exchanger is disposed inside the first housing to operate within an operating range. The data processing module is disposed within the operating range inside the first housing. The optical disc cassette is suitable for being set up within the operating range inside the first housing for storing a plurality of optical discs. Furthermore, the optical disc cassette has at least one hollow. The cassette ejector is disposed on the first housing. The elastic element is disposed inside the first housing. When the optical disc cassette is stationed inside the first housing, a distance is kept between the elastic element and the hollow. The elastic element is disposed on an ejection path of the hollow. The elastic element is suitable for lodging inside the hollow of the optical disc cassette when the optical disc cassette is ejected from the first housing.

In the optical disc drive, the optical disc cassette has a top surface, a bottom surface and a number of side surfaces linking the top and the bottom surface. The hollow is located on the top surface, the bottom surface or one of the side surfaces.

The present invention also provides an alternative optical disc drive mainly comprising a first housing, a disc exchanger, a data processing module, an optical disc cassette, an ejection mechanism and at least an elastic element. An inner wall of the first housing has at least a hollow. The disc exchanger is disposed inside the first housing to operate within an operating range. The data processing module is disposed within the operating range inside the first housing. The optical disc cassette is suitable for being set up within the operating range inside the first housing for storing a plurality of optical discs. The cassette ejector is disposed on the first housing. The elastic element is disposed on an outer wall of the optical disc cassette. When the optical disc cassette is stationed inside the first housing, a distance is kept between the elastic element and the hollow. The hollow is disposed on an ejection path of the elastic element. The elastic element on the outer wall of the optical disc cassette is suitable for lodging inside the hollow when the optical disc cassette is ejected from the first housing.

In the optical disc drive, the optical disc cassette has a top surface, a bottom surface and a number of side surfaces linking the top and the bottom surface. The elastic element is located on the top surface, the bottom surface or one of the side surfaces.

In the two aforementioned types of optical disc drives, the elastic element is a spring plate, for example. The optical disc cassette is constructed using a second housing and a plurality of optical disc carriers, for example. The second housing has an inner wall, an opening and a plurality of guide tracks. The guide tracks are disposed on the inner wall of the second housing. Furthermore, the guide tracks extend in a direction toward the opening, for example. The optical disc carriers are disposed inside the second housing such that each optical disc carrier is suitable for sliding along one of the guide tracks. The data processing module includes an optical pick-up head module or an optical read/write module.

In brief, the optical disc drive of the present invention utilizes the interaction between an elastic element and a hollow to prevent an optical disc cassette from jumping out of the optical disc drive during an ejection operation. Hence, both the optical disc cassette as well as the optical discs inside the optical disc cassette is protected.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
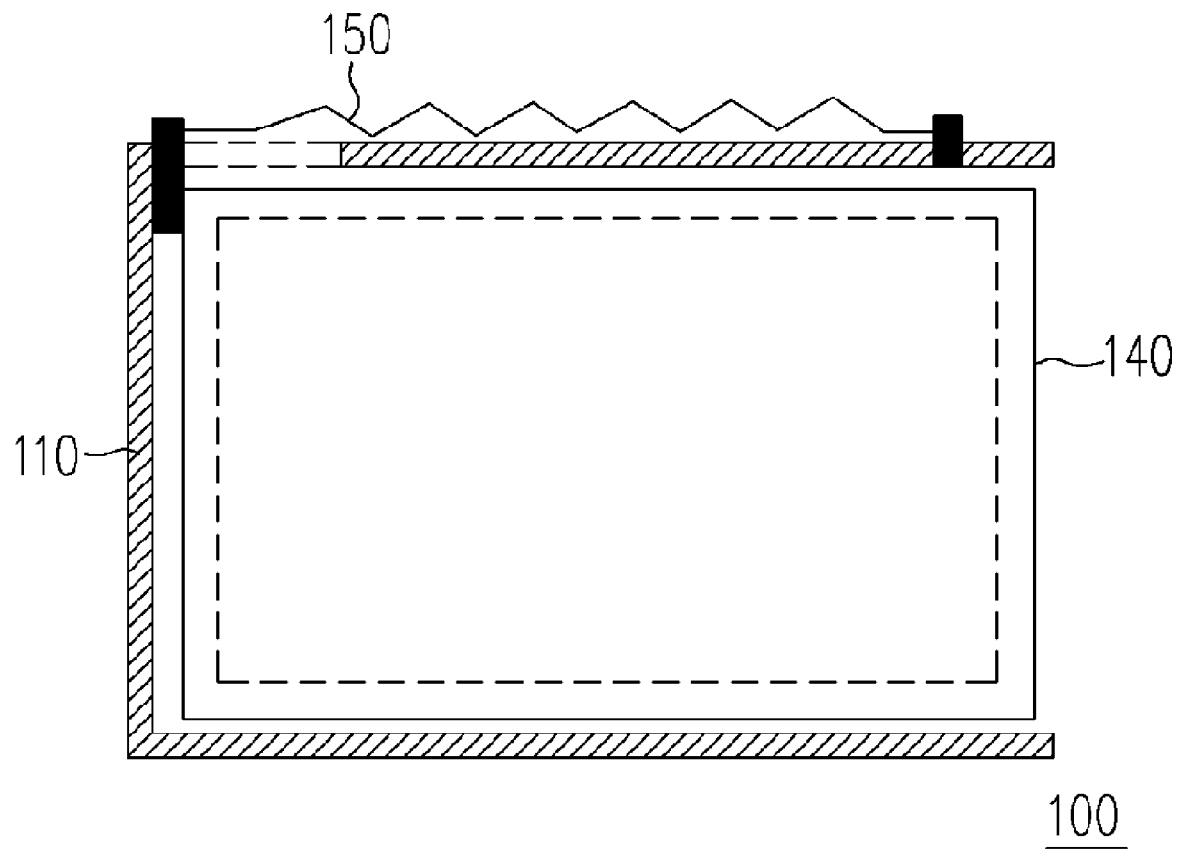
FIG. 1 is a schematic cross-sectional view of a conventional optical disc drive.

Reference will now be made in detail to the present preferred embodiments of the invention, examples of which are illustrated in the accompanying drawings. Wherever possible, the same reference numbers are used in the drawings and the description to refer to the same or like parts.

Figure 2:
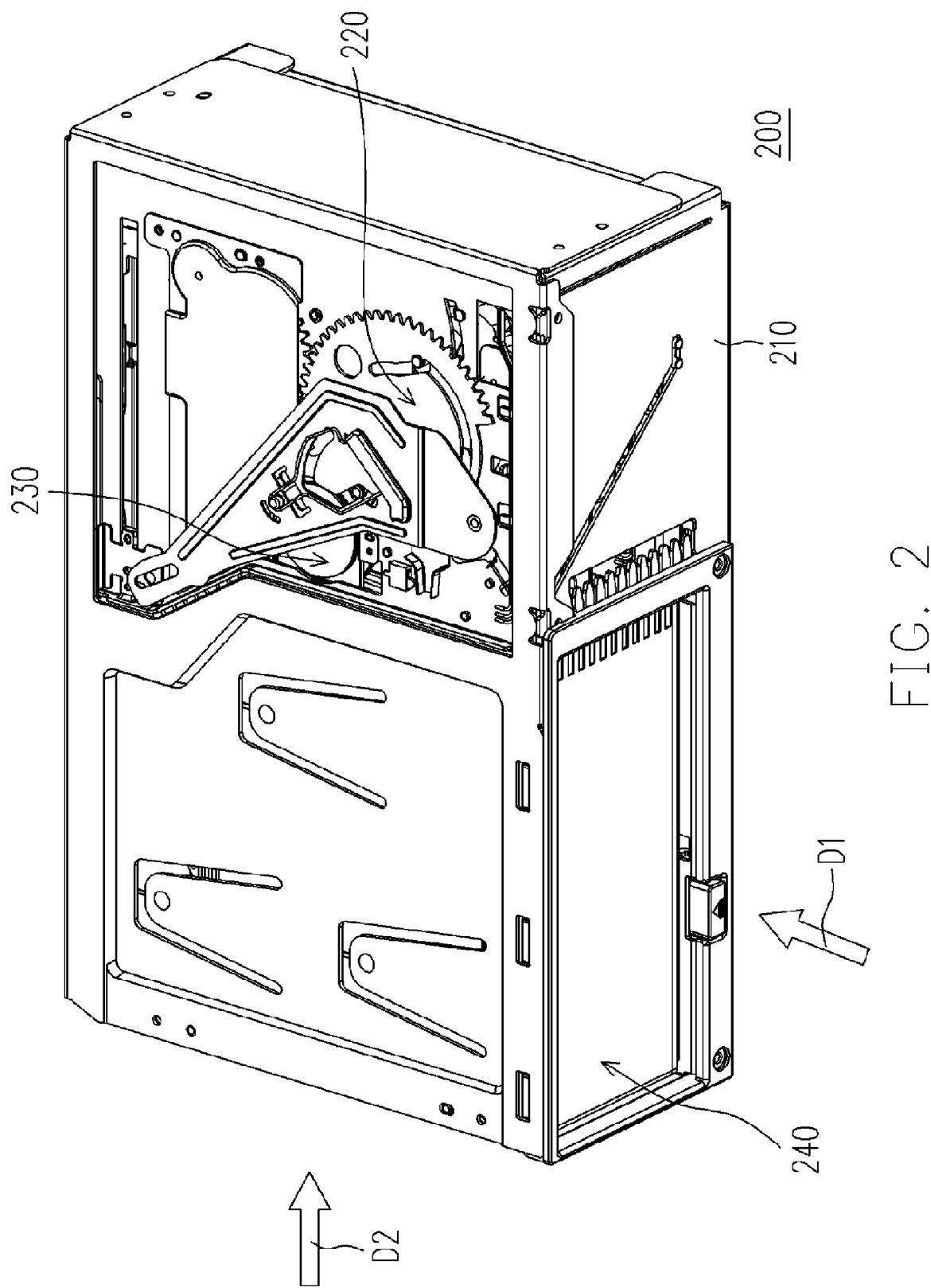
FIG. 2 is a perspective view of an optical disc drive according one preferred embodiment of the present invention.

FIG. 2 is a perspective view of an optical disc drive according one preferred embodiment of the present invention. As shown in FIG. 2, the optical disc drive 200 is a compact disc player (a CD player), a laser optical video disc player (a LD player), a video compact disc player (a VCD player), a digital video disc player (a DVD player) or other optical disc players capable of storing a multiple of optical discs at the same time, for example. The optical disc drive 200 mainly comprises a housing 210, a disc exchanger 220, a data processing module 230, an optical disc cassette 240, an ejection mechanism 250 (shown in FIG. 6A) and at least an elastic element 270 (shown in FIG. 4).

The disc exchanger 220 is disposed inside the housing 210 to operate within an operating range. The data processing module 230 is also disposed inside the housing 210 within the operating range of the disc exchanger 220. The optical disc cassette 240 can store a plurality of optical discs (not shown). Furthermore, the optical disc cassette 240 is suited to dispose inside the housing 210 within the operating range of the disc exchanger 220. The disc exchanger 220 is mainly used for transporting an optical disc from the optical disc cassette 240 to the data processing module 230 or returning an optical disc from the data processing module 230 to the optical disc cassette 240. The disc exchanger 220 may comprise a set of linked levers and gears or other suitable mechanical design, for example. However, the actual operating mechanism of the disc exchanger 220 is not limited to the one shown in FIG. 2. The data processing module 230 is, for example, an optical pick-up module for reading stored data inside the optical disc. Obviously, the data processing module 230 can also be an optical read/write head that allows data to be written to the optical disc. The ejection mechanism 250 is disposed on the housing 210 for ejecting the optical disc cassette 240 from the housing 210. The disposition of the ejection mechanism 250 is explained in more detail in the following.

Figure 3A:
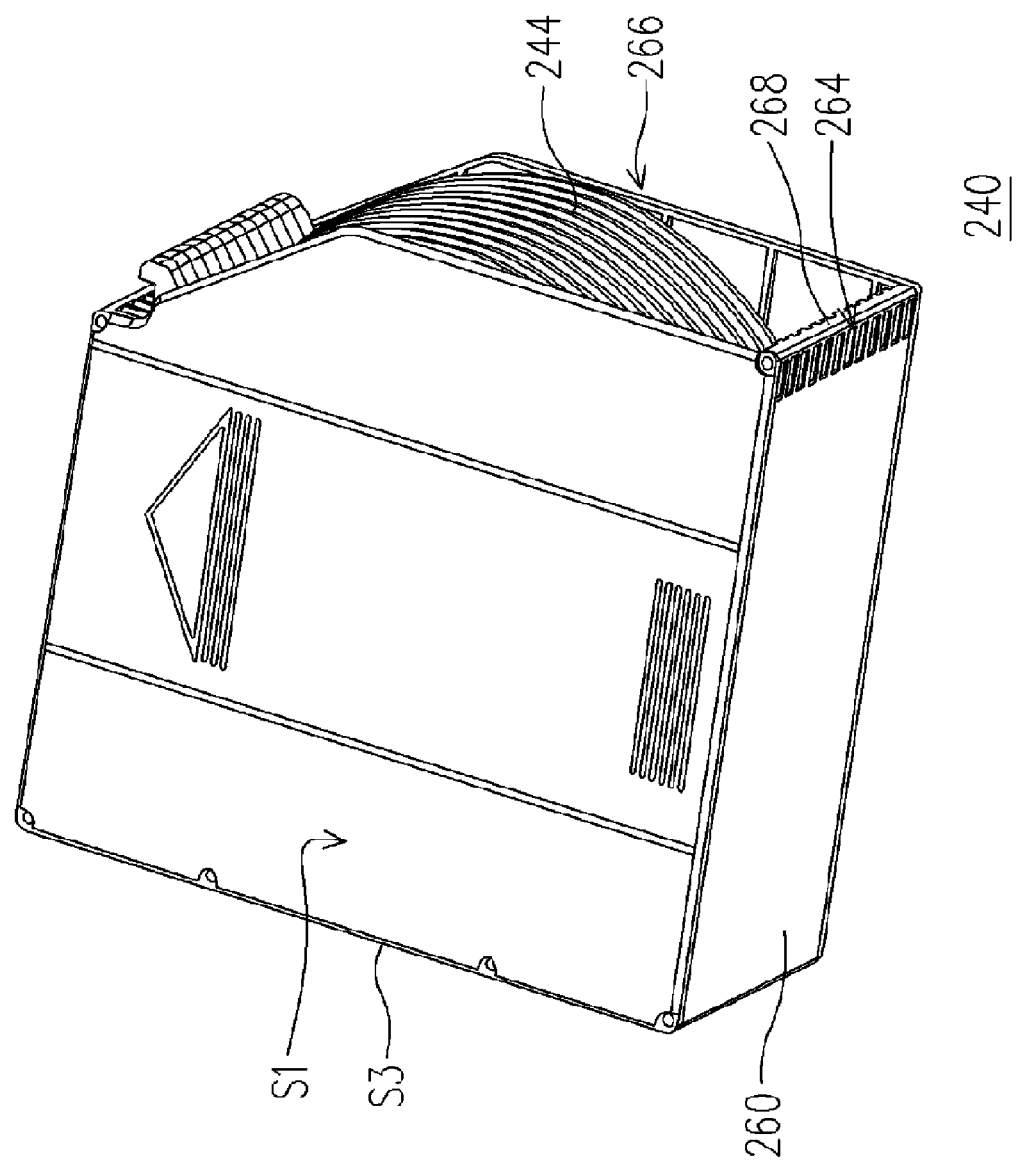
FIGS. 3A and 3B are the perspective views showing the optical disc cassette of the optical disc drive in FIG. 2 in a different viewing angle.
Figure 3B:
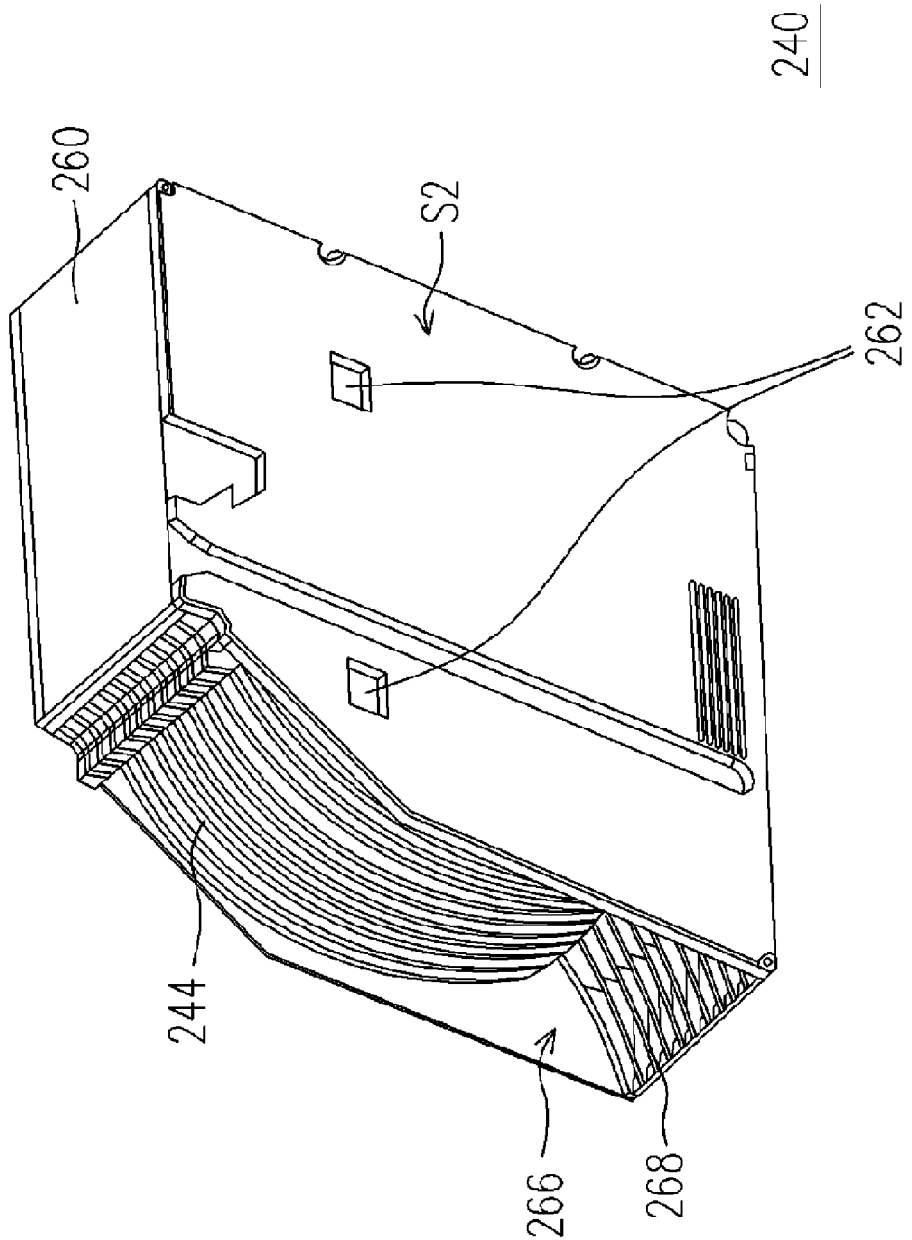

FIGS. 3A and 3B are the perspective views showing the optical disc cassette of the optical disc drive in FIG. 2 in a different viewing angle. As shown in FIGS. 2, 3A and 3B, the surface of the optical disc cassette 240 having possible contact with the housing 210 of the optical disc drive 200 has at least a hollow 262. Here, as an example, the number of hollows 262 is two. Furthermore, the optical disc cassette 240 has a top surface S1, a bottom surface S2 and a number of side surfaces S3 linking the top surface S1 and the bottom surface S2. The hollow 262 can be selectively set on the top surface S1, the bottom surface S2 or at least one of the side surfaces S3. Obviously, if the hollow 262 is located on one of the side surfaces S3, then the side surface S3 on each side of the optical disc cassette 240 in the ejection direction D1 where the optical disc cassette 240 enters into or ejects from the housing 210 is preferred. Here, the hollow 262 is disposed on the bottom surface S2.

In one embodiment, the optical disc cassette 240 is constructed using a housing 260 and a plurality of optical disc carriers 244, for example. The housing 260 has an inner wall 264, an opening 266 and a plurality of guide tracks 268. The guide tracks 268 are disposed on the inner wall 264 of the housing 260. Furthermore, the guide tracks 268 extend in a direction toward the opening 266, for example. The optical disc carriers 244 are disposed inside the housing 260 such that each optical disc carrier 244 is suitable for sliding along one of the guide tracks 268. Because the optical disc cassette 240 is capable of storing a plurality of optical discs at the same time, users are free to select the required data from a particular disc so that the frequency of changing the optical disc manually is reduced. Aside from saving some optical disc changing time, the optical disc cassette 240 also provides the user with greater convenience.

Figure 4:
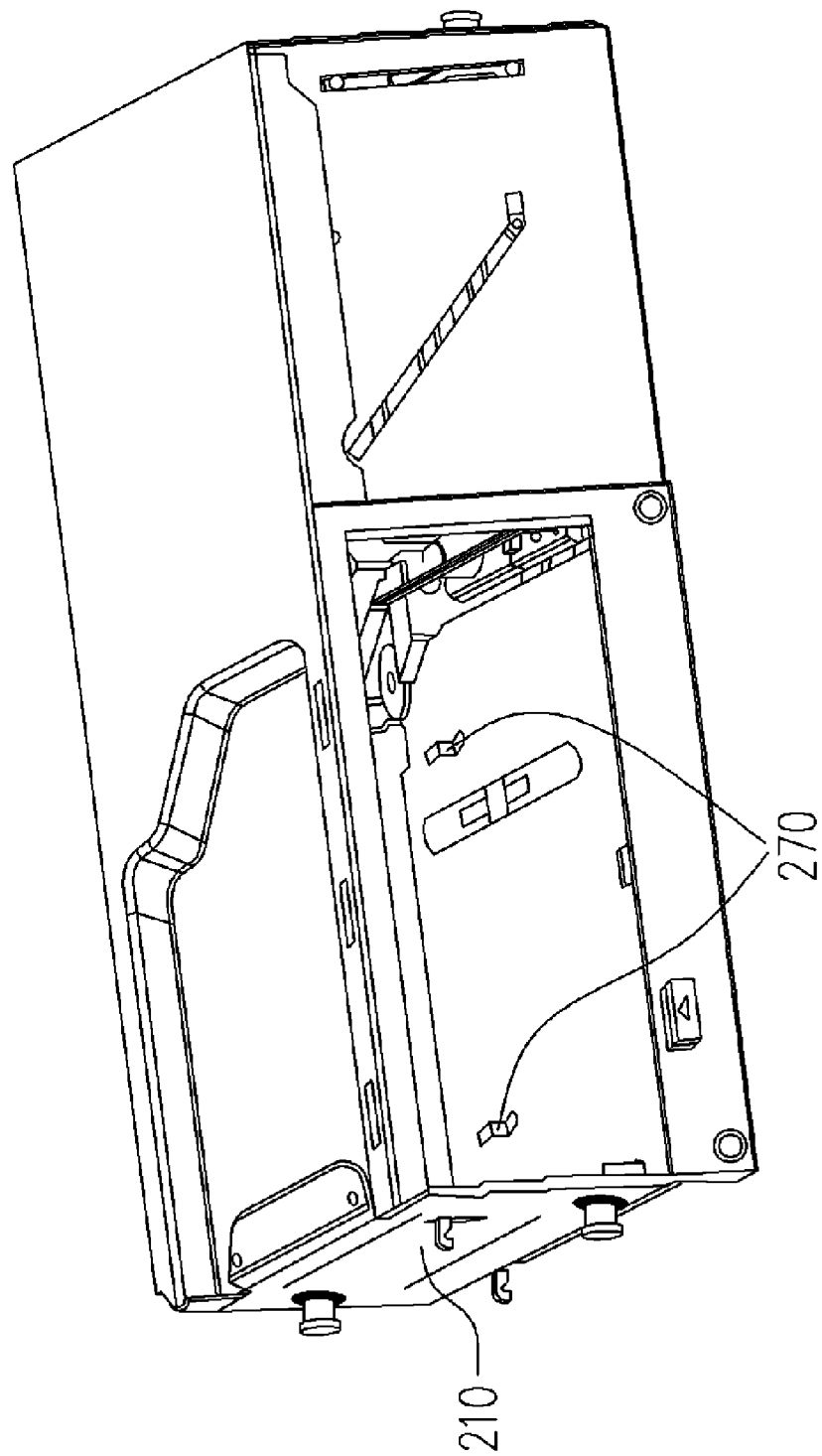
FIG. 4 is a perspective view showing the optical disc drive of FIG. 2 after ejecting the optical disc cassette out.
Figure 5:
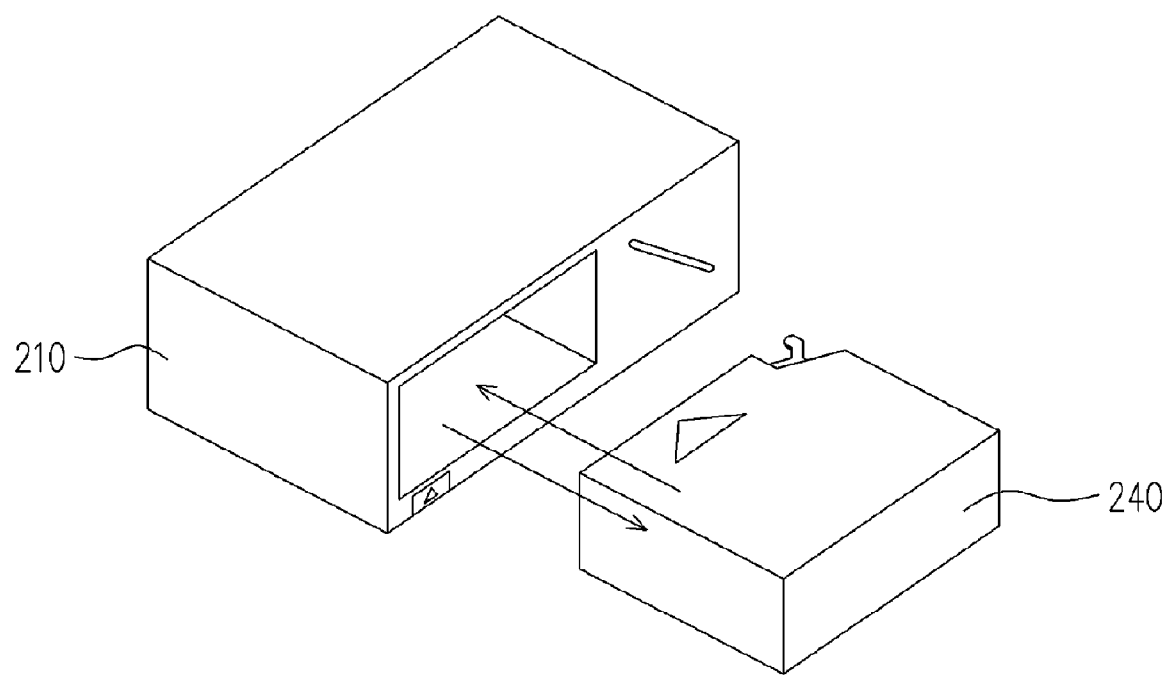
FIG. 5 shows the process of pushing an optical disc cassette in and ejecting an optical disc cassette out of the optical disc drive of FIG. 2.
Figure 6A:
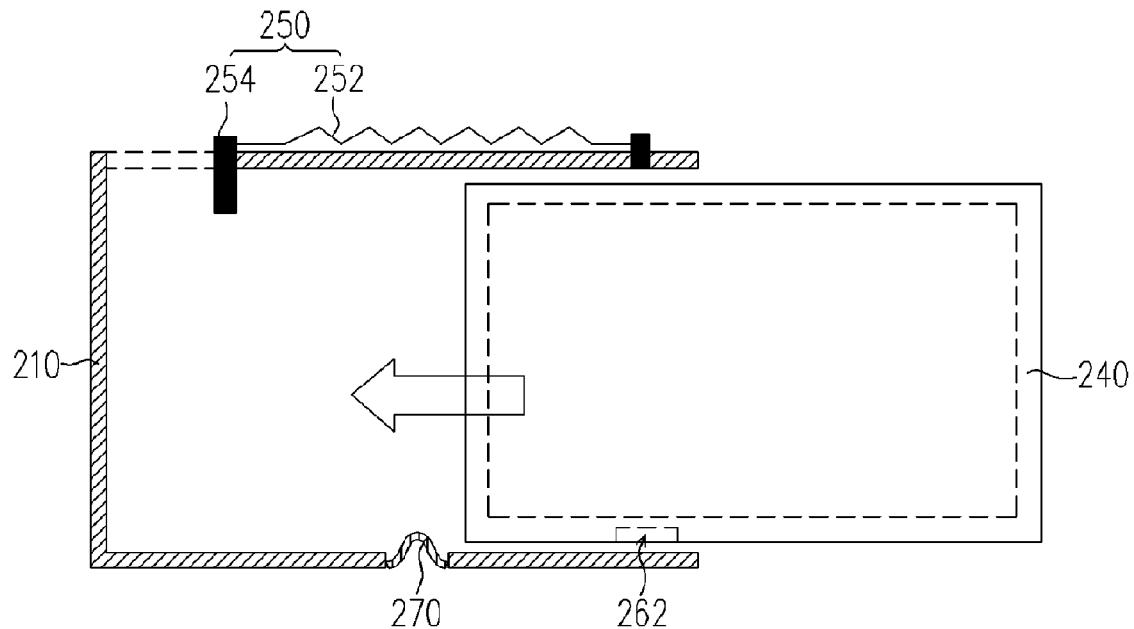
FIGS. 6A through 6C are cross-sectional views of the optical disc drive when viewed in the D2 direction of FIG. 2.
Figure 6B:
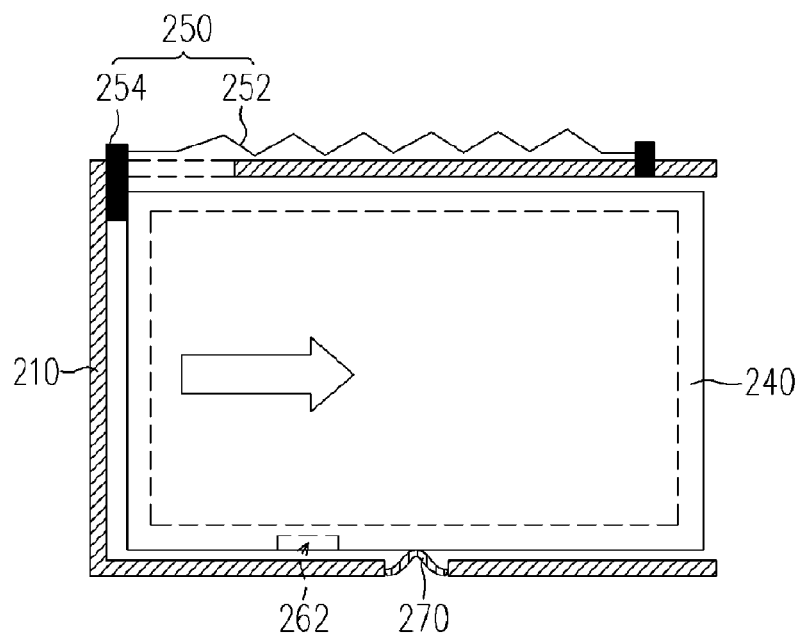
Figure 6C:
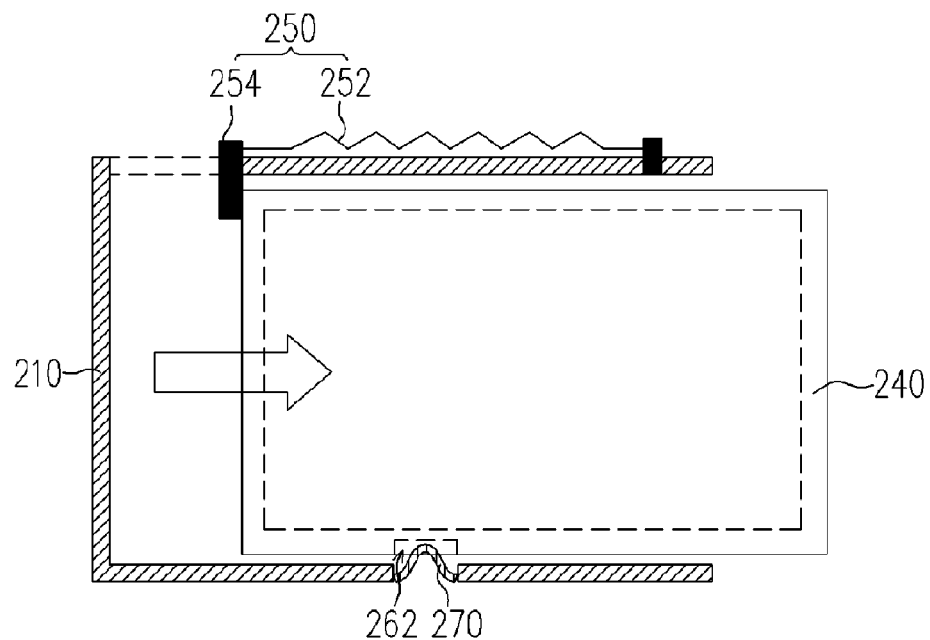

FIG. 4 is a perspective view showing the optical disc drive of FIG. 2 after pulling the optical disc cassette out. FIG. 5 shows the process of pushing an optical disc cassette in and ejecting an optical disc cassette out of the optical disc drive of FIG. 2. FIGS. 6A through 6C are cross-sectional views of the optical disc drive when viewed in the D2 direction of FIG. 2. As shown in FIGS. 3B and 4, the elastic element 270 is set up inside the housing 210 and disposed along the ejection path of the hollow 262. As shown in FIG. 5, the optical disc cassette 240 moves in and out of the housing 210 of the optical disc drive 200 along the direction indicated.

As shown in FIGS. 6A to 6C, the ejection mechanism 250 comprises a spring 252 and a stopper 254, for example. One end of the spring 252 is fastened to the housing 210 while the other end of the string 252 is connected to the stopper 254. The stopper 254 has at least a portion extending into the interior of the housing 210. When the user pushes the optical disc cassette 240 into the housing 210 (as shown in FIG. 6A), the stopper 254 is carried along the movement of the optical disc cassette 240 so that the spring 252 is extended. Ultimately, through a positioning mechanism (not shown), the optical disc cassette 240 is parked inside the housing 210 (as shown in FIG. 6B). After parking the optical disc cassette 240 inside the housing 210, a distance is kept between the elastic element 270 and the hollow 262.

When the user releases the positioning mechanism, the bounce-back force provided by the spring 252 will be transmitted to the optical disc cassette 240 through the stopper 254 so that the optical disc cassette 240 ejects from the housing 210. If a proper location for the elastic element 270 is selected, then the optical disc cassette 240 will reach a location as shown in FIG. 6C in the process of ejecting from the housing 210. In this location, the elastic element 270 will lodge into the hollow 262 of the optical disc cassette 240 when only portion of the optical disc cassette 240 is still inside the housing 210. In other words, even if the bounce-back force of the ejection mechanism 250 is large, the optical disc cassette 240 will not be directly thrown from the housing 210 in one shot. The elastic elements 270 is a spring plate or other design, for example. In addition, the number of elastic elements 270 inside the optical disc drive 200 depends on the number of hollows 262 used.

Figure 7:
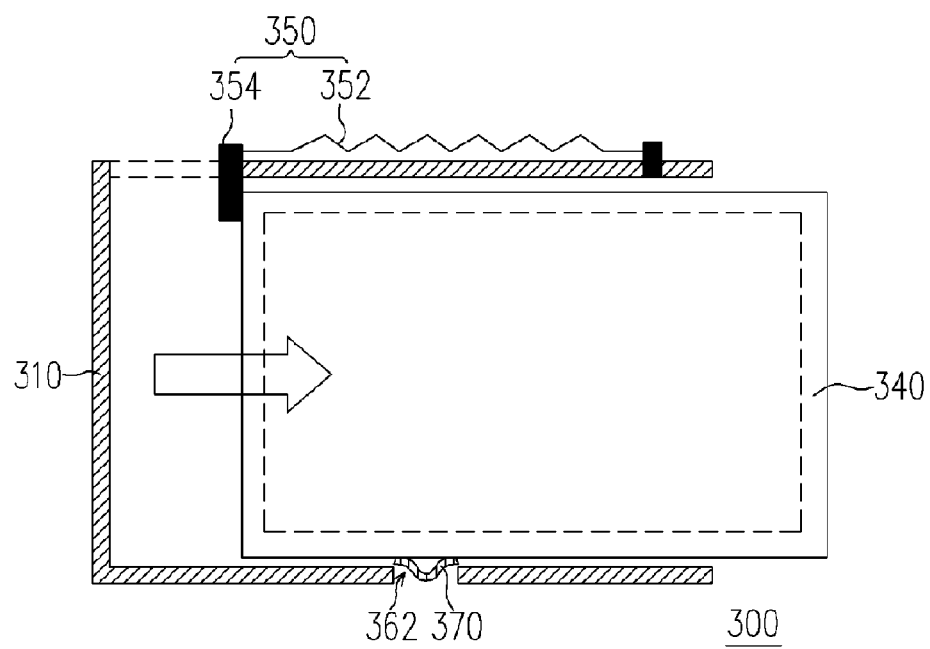
FIG. 7 is a cross-sectional view of an optical disc drive according to another preferred embodiment of the present invention.

FIG. 7 is a cross-sectional view of an optical disc drive according to another preferred embodiment of the present invention. The optical disc drive 300 in the present invention differs from the optical disc drive 200 of the previous embodiment mainly in the locations of the hollow and the elastic element. Since other aspects of the embodiments are identical, a detail description is omitted. The inner wall of the housing 310 of the optical disc drive 300 has at least a hollow 362. The elastic element 370 is disposed on the outer wall of the optical disc cassette 340. Because of the presence of the elastic element and the hollow 362, the elastic element 370 passing by the hollow 362 will automatically lodge inside the hollow 362 for a brief moment when the optical disc cassette 340 is on the way out of the housing 310. Thus, the optical disc cassette 340 is prevented from directly thrown out of the housing 310 in one shot. The selection of the number and disposition of the elastic element 370 on the optical disc cassette 340 is identical to the selection of the hollow 262 in the previous embodiment. There is no particular limitation on the depth of the hollow 362. In fact, the hollow 362 can even be an open hole.

In summary, the optical disc drive of the present invention has a mutually interacting elastic element and hollow pair. Therefore, by setting up the elastic element and the hollow at suitable locations, the optical disc cassette is prevented from being directly thrown out of the housing of the optical disc drive as the ejection mechanism ejects the optical disc cassette. Hence, both the optical disc cassette and the optical discs inside the optical disc cassette are protected.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical disc drive, comprising:
    a first housing having an inner wall with at least a hollow thereon;
    a disc exchanger disposed inside the first housing suitable for operating within an operating range;
    a data processing module disposed within the operating range inside the first housing;
    an optical disc cassette suited to placing within the operating range inside the first housing for storing a plurality of optical discs;
    an ejection mechanism disposed on the first housing; and
    at least an elastic element disposed on an outer wall of the optical disc cassette, wherein when the optical disc cassette is stationed inside the first housing, a distance is kept between the elastic element and the hollow, and the hollow is set up along the ejection path of the elastic element so that the elastic element will lodge into the hollow momentarily when the optical disc cassette is being ejected from the first housing through the ejection mechanism.

2. The optical disc drive of claim 1, wherein the elastic element comprises a spring plate.

3. The optical disc drive of claim 1, wherein the optical disc cassette has a top surface, a bottom surface and a plurality of side surfaces linking up the top surface and the bottom surface, and the elastic element is located on the top surface, the bottom surface or the side surfaces.

4. The optical disc drive of claim 1, wherein the optical disc cassette further comprising:
    a second housing having an inner wall, an opening and a plurality of guide tracks, wherein the guide tracks are disposed on the inner wall and extends in a direction toward the opening; and
    a plurality of optical disc carriers disposed inside the second housing, wherein each optical disc carrier is suited to slide along one of the guide tracks.

5. The optical disc drive of claim 1, wherein the data processing module comprises an optical pick-up module or an optical read/write module.

* * * * *